United States Patent [19]

D'Alessio

[11] 4,448,214

[45] May 15, 1984

[54] MULTI-CHANNEL LAMINAR-FLOW FLUID VALVE

[76] Inventor: Lawrence M. D'Alessio, 2426 Cedar St., Manasquan Park, N.J. 08736

[21] Appl. No.: 443,751

[22] Filed: Nov. 22, 1982

[51] Int. Cl.³ ............................................. F16K 11/02
[52] U.S. Cl. ........................... 137/625.46; 137/625.11
[58] Field of Search ..................... 137/625.13, 625.15, 137/625.16, 625.11, 625.46, 625.21, 625.41

[56] References Cited

U.S. PATENT DOCUMENTS

| | | | |
|---|---|---|---|
| 2,655,405 | 10/1953 | Lattner | 137/625.15 |
| 3,590,872 | 7/1971 | Baity | 137/625.46 |
| 4,195,631 | 4/1980 | Baucom | 137/625.15 |
| 4,224,958 | 9/1980 | Kaplan et al. | 137/625.15 |

Primary Examiner—Martin P. Schwadron
Assistant Examiner—Mark Malkin
Attorney, Agent, or Firm—Charles F. Gunderson

[57] ABSTRACT

A multi-channel, laminar-flow fluid valve has a base portion, a top portion, and an intermediate gasket portion held together by a centrally-located pivot pin. The top portion is rotatable with respect to the gasket and base portions, and has a circular depression or trough concentric with the pivot pin and adjacent to the intermediate gasket. A series of openings are provided through the top portion, equidistant from each other along the trough. A series of ports, aligned with the series of openings, extend from the outside of the top portion for connection to distribution tubes. Inner and outer ridges, concentric with the pivot pin, project from the gasket portion toward the top portion to fit within the inner and outer edges of the trough, respectively. Smaller circular ridges, fitting between the inner and outer ridges, are positioned to align with the series of openings through the top portion. A hole through one of these small circular ridges and the gasket aligns with another port extending from the other side of the intermediate gasket, and projects through a hole in the base portion for connection to a tube. As the top is rotated, each of the distribution tubes is coupled, in turn, through the hole in the gasket to the bottom tube. The other distribution tubes are sealed off.

6 Claims, 8 Drawing Figures

MULTI-CHANNEL LAMINAR-FLOW FLUID VALVE

BACKGROUND OF THE INVENTION

There are very many types of valves to control the flow of fluids in their many states. These include everything from basic plumbing valves or faucets to two-way or multiple-function valves. More sophisticated valves, such as seen in the U.S. Pat. No. 4,195,631, to Baucom for a "FLOW REGULATING DEVICE USEABLE IN PLASMA PHERESIS" can switch between two or more sources or outlets for special purposes.

Multiple switching, such as this, is necessary where fluid inputs or outputs, from or to a plurality of reservoirs, must be directed to a common input or outlet, or be reversed, in direction of flow after processing, as in dialysis or plasma pheresis. In some of these functions, the flow must be laminar to avoid vortices and possible formation of bubbles that could create embolism, for example. This would preclude the use of many types of valves or petcocks, well known and commonly available for medical and other purposes.

Multiple input or output valves could involve separate cntrols or a single, rotary switching mechanism, as in Baucom. However, while the concept is simple and basic, its function and switching procedures become complex. The simple movement of an opening or port along a series of other openings to alternately open and close the openings in sequence, either in a linear path or in a circular path, is an obvious solution, but is over-simplified in theory and does not necessarily work in practice.

Either the surfaces must be in close contact, with considerable friction between the elements as the openings are moved from one alignment to another, or they must be clamped, when they come into alignment, to insure a seal against leakage. This is the case in Baucom, where the mechanism must be tightened by screw threads when it is in position, and then loosened, with inevitable leakage, to move on to the next position.

Another serious problem with the more sophisticated switch valves is cost. Devices such as that of Baucom are expensive to manufacture, and must be cleaned and sterilized after each use, since they could hardly be considered disposable.

It is therefore an object of this invention to provide a simple, rotary valve that turns easily from one source to another, providing laminar fluid flow and almost no leakage. It is a further object of this invention to provide a multi-function valve that has few moving parts. It is a further object of this invention to provide a valve that has moldable parts for low cost and easy assembly. It is a further object of this invention to provide a multi-function valve, particularly useful for medical purposes, that is disposable.

SUMMARY OF THE INVENTION

A laminar-flow valve has opposing sides rotatable secured by a common pivot. Ports on one side engage one or more ports on the other side in the course of rotation. A pliable gasket is positioned between the opposing sides to seal off the ports not being used and to allow fluid flow only between the ports in use. The pliable gasket has concentric ridges on one side that fit into a concentric depression or trough in the adjacent rotary side to prevent leakage, and has additional circular ridges that surround and seal off the ports in turn as the valve is rotated.

DETAILED DESCRIPTION OF THE DRAWINGS

Figure 1:
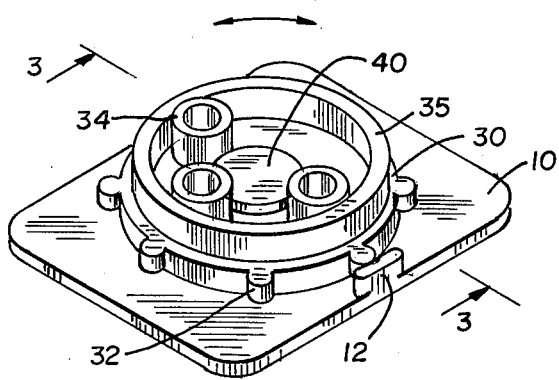
FIG. 1 is an isometric view of one side of the valve.

Referring now more particularly to FIG. 1, an isometric view is shown of the one, upper side of the valve with a base portion 10 supporting a rotatable switch portion 30, coupled by a pivot pin 40. The base portion has a detent catch 12 to engage detent lugs 32, of the upper, rotatable switch portion, in sequence. Ports 34 are seen projecting from the upper rotatable switch portion, as well as is a reinforcing ring 35.

Figure 2:
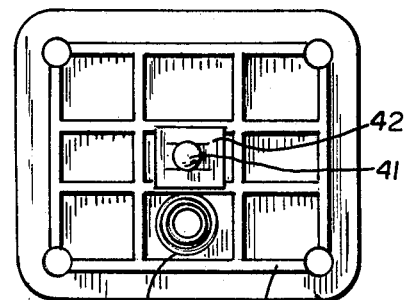
FIG. 2 is a plan view of the other side of the valve.

FIG. 2 shows a plan view of the under side of the other side of the valve with the lower end 41 of the pivot pin 40 secured in place by a retaining ring 42. A port 22 of an intermediary gasket is seen projecting through the base portion to be coupled to any suitable hose. Reinforcing ribs, such as 15, are also shown.

Figure 3:
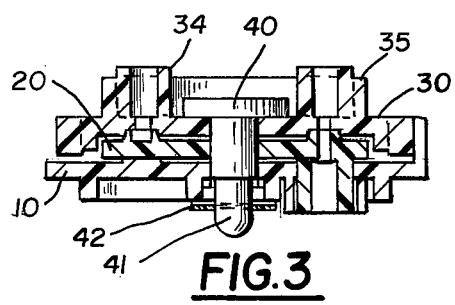
FIG. 3 is a cross section of the assembled valve.

FIG. 3 is a cross section, through the central portion, of the assembled device. This shows the base portion 10 coupled to the rotatable switch portion 30 by means of the pivot pin 40, with its lower end 41 and retaining ring 42. In this, as in all the drawings, similar elements are similarly numbered. The intermediary gasket 20, which is essential to the operation of the valve, is between the two sides or portions and will be more clearly illustrated and described in later drawings.

Figure 4:
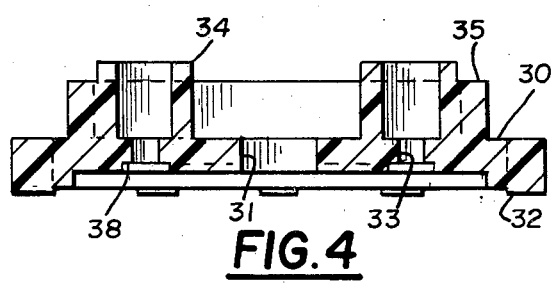
FIG. 4 is a cross section of the one side of the valve.
Figure 5:
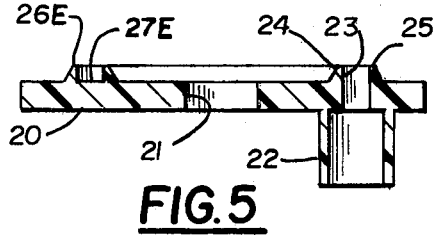
FIG. 5 is a cross section of the central gasket.
Figure 6:
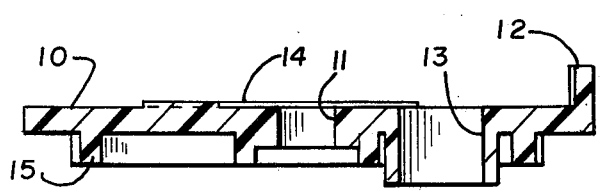
FIG. 6 is a cross section of the other side of the valve.

FIGS. 4, 5, and 6 are cross sections of the three prime elements of FIG. 3 to isolate and more clearly illustrate details and functions. In FIG. 4 the rotatable switch portion 30 is seen to have a central pivot hole 31 and openings, such as 33, that are sealed by —or pass fluids through—the gasket 20 as the valve is rotated. These openings 33 are positioned along a circular depression or trough 38 that will accomodate the fluid-sealing ridges of the gasket. The detents 32, along with the ports 34 and the reinforcing ring 35 are as seen in FIGS. 1 and 3.

FIG. 5 is a cross section of the central, intermediary gasket 20 with its pivot hole 21 and port 22, for coupling to an input or output tube, and with an opening 23 that provides the opening of the valve. Inner and outer ridges 24 and 25, that are to engage the inner and outer edges 36 and 37 of the circular depression 38, of the rotatable switch portion 30, are also shown. These ridges 24 and 25 will be seen more clearly in FIGS. 7 and 8, along with the ridges of the circular valve seals 26.

FIG. 6 is a cross section of the base portion 10, showing, more clearly, a pivot hole 11, the detent catch 12, and a base hole or opening 13 to accomodate the port 22 of the gasket 21. A raised portion 14 is provided to urge the ridges of the gasket against the circular depression 38 of the rotatable switch portion 30, seen in FIG. 4.

Figure 7:
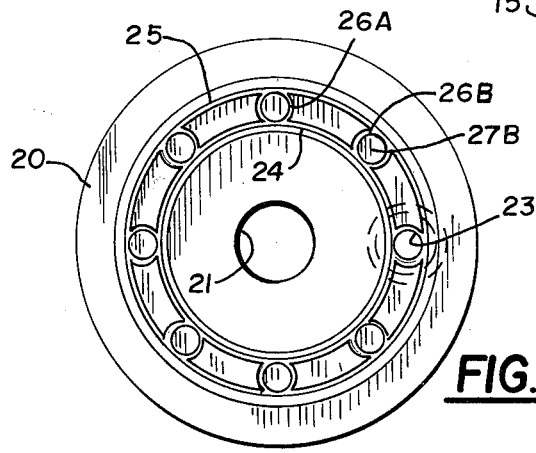
FIG. 7 is a plan view of the upper side of the gasket.

FIG. 7 is a plan view of the side of the gasket 20 that fits against the rotatable switch portion. Concentric about the pivot hole 21 are the inner and outer ridges 24 and 25. Here, however, are clearly seen the sealing rings 26, the valve opening 23, and the blocking portions such as 27B. Each of these sealing rings is positioned to surround a corresponding one of the openings 33 of the upper, rotatable switch portion, to open or seal these ports.

Figure 8:
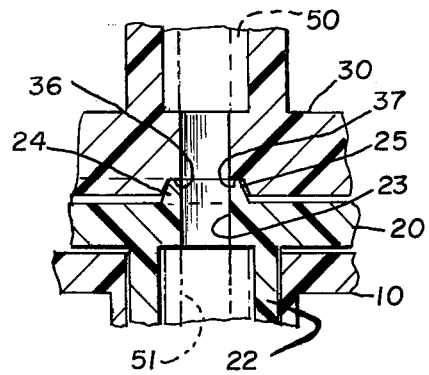
FIG. 8 is a cross section of an enlargement of the open portion of the valve.

FIG. 8 is an enlarged cross section of a portion of the assembled device including part of the base 10, the gasket 20, and the upper rotatable switch portion 30. This shows, more clearly, the inner and outer ridges 24 and 25 of the intermediate gasket engaging the inner and outer edges 36 and 37 of the circular depression in the rotatable switch portion. A portion of a tube 50 is shown in the upper port, and another portion of a tube 51 is shown in the lower port 22 of the intermediate gasket 20. This illustrates the laminar flow between tubes 50 and 51 when the ports and holes are aligned.

In operation, the port 22 of the switching gasket 20 is fitted through the base hole 13 of the base portion 10. The upper, rotatable switch portion is fitted on top of the gasket 20 with the inner and outer edges of its circular depression 38 fitting over the inner and outer ridges 25 of the gasket. The pivot pin 40 is fitted through the corresponding pivot holes to be secured by the retaining ring 42.

Tubes, such as 50, from two or more sources are connected to the various ports such as 34, and another tube 51 is connected to the port 22. Each of the ports 34 includes an opening such as 33, so that when any port is aligned with the opening 23 in its sealing ring, the corresponding tube is connected, through openings 33 and 23, to the tube 51, and fluid may flow in either direction, as desired. All other tubes are shut off by their respective sealing rings, such as 26B, with their blocking portions, such as 27B.

In the embodiment of FIG. 1, three ports 34 are shown in quadrants of the rotatable switch portion 30. However, detents 32 are also provided between the quadrants, and sealing rings, such as 26B, are also aligned with these intermediary detents to provide an off position for all of the elements of the switch between the active, laminar-flow portion.

The laminar flow provided by this switch is essential in controlling certain kinds of fluids, where, particularly in transfusions, introvenous feeding, or dialysis turbulence may have an undesirable effect on the fluids. The alignment and the laminar flow is the same for each of the tubes connecting through the ports 34, since there is no change in the inner diameter of the tubes or openins 33 and 23.

Only three ports are shown in FIG. 1, but it will be obvious that many more—or fewer—can be accommodated in this switch. The intervals between the ports can be greater or less than shown. Also, the size of the device may be varied to accommodate larger or smaller ports, as well as the differing number of ports.

The two outer portion 10 and 30 should be made of a hard or rigid material, presumeably plastic that can be readily molded. They may also be reinforced, as shown or in other ways known in the art. This inner, switching gasket, however, must be of a resilient material so that the inner and outer ridges and sealing rings will compress and seat tightly against the inner and outer edges of the circular depression 28, as well as around each of the openings 33 to avoid leakage; whether in the open position, in alignment with the opening 23, or in any of the closed positions, such as that of 27B. The edges of the circular depression 38 keep the softer, inner and outer ridges from distorting or failing under heavy pressure. In fact, pressure improves the seal.

The pivot pin could be any conventional bolt or rivet that can hold the elements together with adequate pressure. Reinforcing ribs 15, or ring 35 provide additional rigidity to the outer members to ensure a tight seal between the elements of the gasket 20 and the elements of the rotating switch portion 30.

I claim:

1. A multi-channel, laminar-flow fluid valve comprising a first, circular, outer member; a second outer member; and a circular inner member; each of said members having a centrally-located pivot hole; a pivot pin extending through said centrally-located pivot holes; means on each end of said pivot pin to hold said members together in a rotatable condition; a continuous circular depression, concentric with said pivot pin, on the inner surface of said first outer member, a plurality of openings through said first outer member, equidistant from each other around said continuous circular depression; a plurality of ports, for connecting to tubes, aligned with said plurality of openings, on the outer surface of said first outer member; an inner and an outer circular ridge, concentric to said pivot pin, projecting from the surface of said inner member adjacent to said inner surface of said first outer member to engage an inner and an outer edge of said continuous circular depresssion, respectively a plurality of smaller circular ridges projecting from the surface of said inner member between said inner and outer circular ridges, equidistant from each other and positioned to correspond with the location of said plurality of ports in said first outer member; an opening through said inner member in the center of one of said smaller circular ridges; a port, extending from the opposing side of said inner member and aligned with said opening through said inner member, to connect to a tube; an opening through said second outer member to contain said port of said inner member, said inner member being made of resilient material so that pressure exerted between said two outer members compresses said ridges along said edges of said depression and around said openings through said first outer member to provide a tight gasket.

2. In a multi-channel, laminar-flow fluid valve as in claim 1, an additional series of smaller circular ridges projecting from the surfaces of said inner member between said inner and outer circular ridges, each of said additional series of smaller circular ridges being positioned equidistant between said circular ridges corresponding with the location of said ports, to provide an off-switching position between each on-switching position.

3. in a multi-channel, laminar-flow fluid valve as in claim 1, a plurality of detent lugs projecting from the periphery of said first circular output member, each one in line with one of said plurality of ports, and a detent catch mounted on said second output member in line with said port extending from the opposite side of said inner member to mark and hold the exact alignment of the ports and their openings.

4. A multi-channel, laminar flow fluid valve as in claim 1 wherein the diameter of each of said plurality of openings through said first outer member is the same as the diameter of said opening through said inner member, and the same as the inner diameter of tubing connected to said ports.

5. In a multi-channel, laminar-flow fluid valve as in claim 1, wherein said first outer member and said second outer member are formed of rigid material, means for reinforcing said outer members to reduce distortion as the members are compressed by said pivot pin.

6. In a multi-channel, laminar-flow fluid valve as in claim 1, means, combined with said means on each end of said pivot pin, for controlling the pressure on said first and second outer members.

* * * * *